US008766778B2

(12) United States Patent  (10) Patent No.: US 8,766,778 B2
Brown  (45) Date of Patent: Jul. 1, 2014

(54) SYSTEM AND METHOD FOR AUTHENTICATING RFID TAGS (75) Inventor: Daniel Richard L. Brown, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 840 days.

(21) Appl. No.: 12/771,335

(22) Filed: Apr. 30, 2010

(65) Prior Publication Data

US 2010/0308978 A1 Dec. 9, 2010

Related U.S. Application Data (60) Provisional application No. 61/174,064, filed on Apr. 30, 2009.

(51) Int. Cl.
*H04Q 5/22* (2006.01)

(52) U.S. Cl.
USPC .............. 340/10.4; 340/10.2; 726/9; 713/176

(58) Field of Classification Search
USPC .................. 340/5.2, 10.1, 10.42, 572.1, 531; 455/110; 380/255, 277, 28, 270, 282, 380/285; 382/119; 713/168, 176, 180; 726/9, 20

See application file for complete search history.

(56) References Cited

U.S. PATENT DOCUMENTS

| 2003/0138135 | A1 | 7/2003 | Chung et al. |
| 2007/0057768 | A1 | 3/2007 | Zeng et al. |
| 2007/0200702 | A1 | 8/2007 | Chung |
| 2007/0217601 | A1* | 9/2007 | Lambert et al. ................. 380/28 |
| 2008/0069347 | A1 | 3/2008 | Brown et al. |
| 2008/0095357 | A1* | 4/2008 | Kitamura et al. ............... 380/28 |
| 2008/0125083 | A1 | 5/2008 | Rhoads |
| 2008/0150702 | A1 | 6/2008 | Neill et al. |
| 2008/0164976 | A1* | 7/2008 | Griffiths-Harvey et al. . 340/10.1 |
| 2008/0191882 | A1* | 8/2008 | Zhou et al. .................. 340/572.4 |
| 2009/0100267 | A1 | 4/2009 | Brown et al. |
| 2010/0034382 | A1* | 2/2010 | Xu ............................... 380/255 |

FOREIGN PATENT DOCUMENTS

WO WO 03/013864 A1 2/2003

OTHER PUBLICATIONS

Chitiu, Adrian; Internation Search Report from corresponding PCT Application No. PCT/CA2010/000663; search completed Jul. 27, 2010.
Juels, A., "Attack on a Cryptographic Device"; RFID Journal; Feb. 2005.
EESR dated Apr. 23, 2014, from EP Application No. 10769195.8.

* cited by examiner

*Primary Examiner* — Brian Zimmerman
*Assistant Examiner* — Laura Nguyen
(74) *Attorney, Agent, or Firm* — Etienne de Villiers; Dimock Stratton LLP (57) ABSTRACT A system and method of providing authenticity to a radio frequency identification (RFID) tag are provided. The method comprises generating a plurality of digital signatures, wherein each digital signature is generated using an index value unique to that digital signature and using information associated with the RFID tag; and storing the plurality of digital signatures on the RFID tag in association with respective index values to enable a desired digital signature to be selected according to a provided index value. Also provided are a system and method of enabling an RFID reader to authenticate an RFID tag, which utilize a challenge comprising an index value to request one of the stored signature and authenticating same. Also provided is an RFID tag that is configured to participate in the challenge-response protocol.

16 Claims, 9 Drawing Sheets

SYSTEM AND METHOD FOR AUTHENTICATING RFID TAGS

This application claims priority from U.S. Provisional Application No. 61/174,064 filed on Apr. 30, 2009, the contents of which are incorporated herein by reference.

TECHNICAL FIELD

The following relates generally to radio frequency identification (RFID) technology, and has a particular utility in authenticating RFID tags.

BACKGROUND

Traditionally, objects such as inventory of commercial products have been given an associated identifier to allow the object to be tracked, identified, and/or monitored. Recently, barcodes are in some cases becoming displaced by RFID technology as a means for providing such identifiers. RFID technology is beneficial as it can provide an automated identification system rather than requiring a user or machine to locate the barcode tag and then scan the barcode in a particular way.

RFID technology relies on the storage and remote retrieval of data from devices typically referred to as RFID tags or RFID transponders (hereinafter commonly referred to as "RFID tags" for clarity). An RFID tag is an object that can be attached to or incorporated into a product (or even a living being such as an animal), for the purpose of providing identification of the product or information related thereto, using radio waves. There are chip-based RFID tags containing a silicon chip and a antenna and, currently, RFID tags are either passive or active.

Passive RFID tags require no internal power source. The relatively small electrical current induced in the antenna by the incoming radio frequency signal provides enough power for the circuit in the tag to power up and transmit a response. Often, passive tags signal by backscattering the carrier signal from the reader and thus the antenna is designed to both collect power from the incoming signal and also to transmit the outbound backscatter signal. Without requiring an onboard power supply, passive RFID tags can be smaller and more cost effective to implement.

Active RFID tags have their own internal power source which is used to power any circuit residing on the tag that generates an outgoing signal. Active tags have been found to be more reliable than passive RFID tags since active tags can conduct a "session" with a reader. Using an onboard power supply, an active RFID tag can transmit a higher power signal which allows them to be more effective in areas where RE signals have trouble transmitting, e.g. through water, and/or over relatively long distances. The onboard power supply also requires more space and thus active RFID tags are generally larger and more expensive than passive RFID tags.

An RFID system generally comprises one or more tags, one or more tag readers, and often other supporting infrastructure such as a database. Often, the purpose of an RFID system is to enable data on an RFID tag to be read and processed by an RFID reader. The amount of processing and the nature of the data is largely dependent on the application. For example, the information transmitted by the tag may provide identification or location information, or specifics about the object to which the tag is affixed. In typical applications such as inventory tracking, the RFID system may use small, inexpensive tags affixed to objects that are being tracked. The tag contains a transponder with a memory that is given a unique code (e.g. a product code). A signal is emitted from the reader, the signal activating the RFID tag such that the reader can read and write data to the tag. When the RFID tag passes through an electromagnetic zone created by the emission, the tag detects the reader's activation signal. The reader decodes the data encoded in the tag's memory and the data is passed to the supporting infrastructure for its particular use.

RFID technology is becoming more popular not only because it can reduce the effort involved in tracking inventory and commercial products, but also for its ability to be applied to various wider applications, such as security, access control, and electronic commerce (e.g. for securing millions of transactions in rapid, near-field payment systems). These systems typically utilize a cryptographically enabled RFID tag, such as that available from Texas Instruments and commonly referred to as a "Digital Signal Transponder" (DST). The DST is a passive RFID tag which uses an encryption algorithm, sometimes referred to as a cipher, to implement a challenge-response authentication protocol. Each DST contains a secret 40 bit encryption key, which is shared with the reader. The reader issues a 40-bit challenge, which is enciphered by the DST using the shared key. The enciphered challenge may then be truncated by the tag to produce a 24 bit response, which is then transmitted back to the reader. The received response is compared by the reader to an expected result, computed from the same shared key, in order to authenticate the DST tag.

BRIEF DESCRIPTION OF THE DRAWINGS

Embodiments will now be described by way of example only with reference to the appended drawings wherein.

DETAILED DESCRIPTION

It has been recognized that an increasing concern as RFID tags are used in broader applications, is the potential loss of privacy and potential identity theft. One approach to increase RFID security and privacy is to permanently disable the tag through a "kill" command. This technique may not be practical for tags requiring multiple uses, which is often the case for vehicle immobilizer and near field rapid payment systems. Some of the other security measures lacking practical and technological feasibility include active jamming of transmissions from the RFID tags and enclosing the tag in a metal mesh or foil container (Faraday cage) that is impenetrable by radio frequency signals. These measures may be considered necessary in some circumstances because of the inherently weak security implementations used with the currently available RFID tags.

In 2005, a team of researchers at Johns Hopkins University Information Security Institute and RSA Laboratories announced a security weakness in the DST tag. The team was able to break the system and crack the key from reading just two challenge/response pairs. Furthermore, the team was able to digitally clone DST tags from their original counterparts to enable an automobile and for payment of gasoline using the "SpeedPass" system as discussed in the RFID Journal article entitled "Attack on a Cryptographic RFID Device" by Ari Juels, February 2005.

The attack on the DST tag was deemed to be as a result of a weakness in the design of the low processing power cryptographic algorithm, and the small size of the encryption key. Most of the inexpensive RFID tags belong in the Class 1 and 2 categories as defined by the industry body, EPCglobal (www.epcglobalinc.org). These tags are known to have limited computational and storage capabilities and can lack support for performing cryptographic operations, such as generating digital signatures. Since a passive tag is powered by its interaction with an electromagnetic field transmitted by the reader, any additional computation can significantly reduce the effectiveness (range) of the tag.

It can be expected that memory in RFID tags should continue to drop in price more rapidly than processors. Therefore, an approach which depends on additional memory is preferable to a more processor intensive cryptographic algorithm for securing RFID tags.

Notwithstanding, a limiting constraint is often the storage space available on such inexpensive RFID tags. An asymmetric cryptographic algorithm such as the Rivest-Shamir & Adleman (RSA) algorithm would likely require a minimum 1024 bit signature. The relatively large size of an RSA signature can result in a tag which is prohibitively expensive. In some commercial applications, such as in the manufacturing of pharmaceutical products, multiple signatures may need to be stored, as more fully discussed in U.S. application Ser. Nos. 11/852,709; 11/852,819; and 11/898,181, each filed on Sep. 10, 2007.

To overcome the above-described drawbacks, the following provides a system and method for authenticating an RFID tag that utilizes multiple signatures stored on the RFID tag to randomize the authentication process, and to avoid skimming or other malicious attacks.

Figure 1:
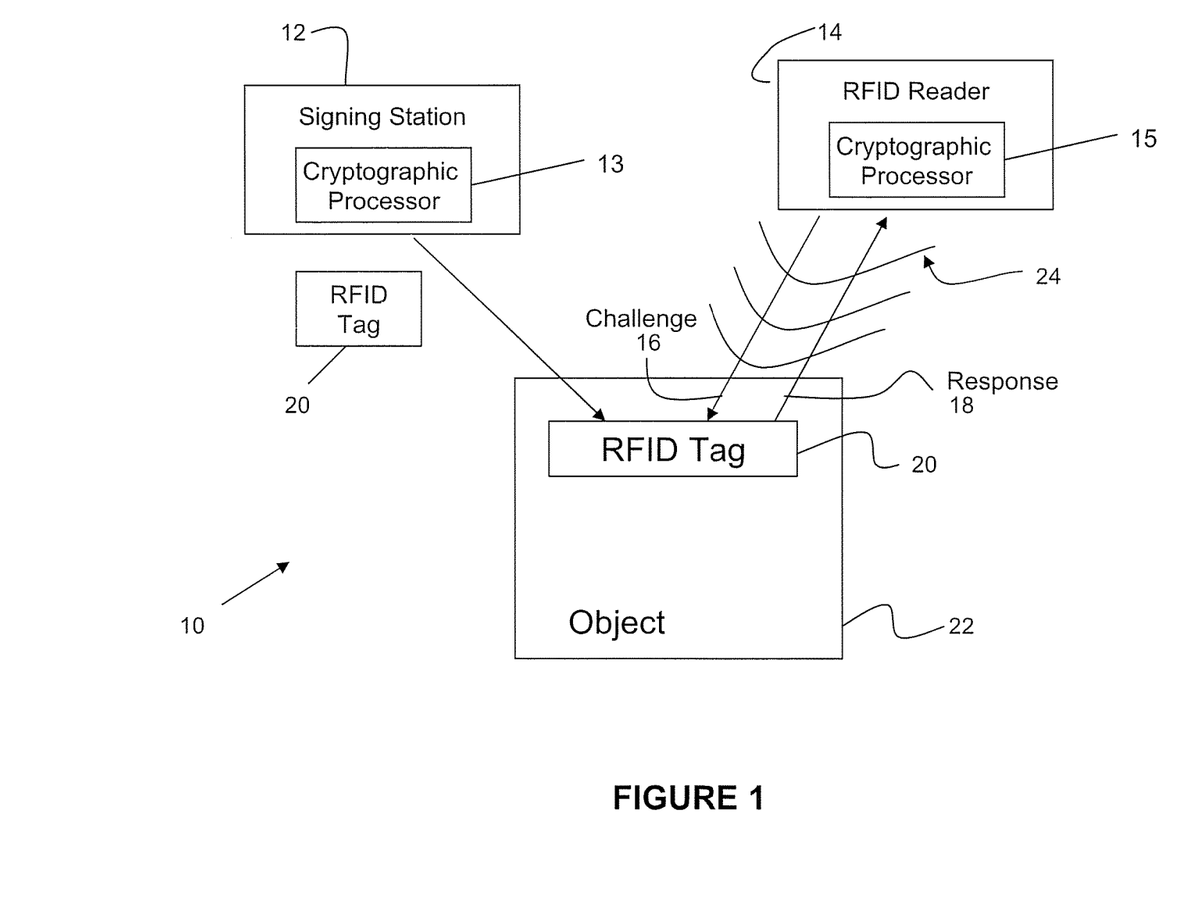
FIG. 1 is a schematic block diagram showing an RFID challenge-response system.

Referring now to FIG. 1, an RFID authentication system 10 is shown (hereinafter "the system 10" for brevity) which, in this example, utilizes a challenge-response scheme for authenticating an RFID tag 20. The system 10 shown in this example comprises a signing station 12 having a cryptographic processor 13 for performing cryptographic operations. In this example, the cryptographic processor 13 is configured to perform elliptic curve cryptographic (ECC) operations that suit the particular application, operations such as digital signature generation operations performed in executing one or more ECC signature schemes (to be discussed in greater detail below). The signing station 12 can be any computing device that is purposed for processing an RFID tag 20 to incorporate cryptographic protection, in this example by generating and storing digital signature on the RFID tag 20. For example, the signing station 12 may use the cryptographic processor 13 to generate bit strings representing digital signatures and writes those digital signatures to an RFID tag 20 either before or after the RFID tag 20 is affixed to an object 22. The signing station 12 can also be configured to incorporate additional domain parameters and information into a signing operation, such as by writing its public key to the RFID tag 20 to permit the signatures to be verified.

The system 10 also comprises an RFID reader 14, which is typically remote and independent from the signing station 12. The RFID reader 14 is configured to generate a radio frequency (RF) field 24, which energizes the RFID tag 20 when the RFID tag 20 is within a communicable range. It can be appreciated that other devices (not shown) can be configured to act as both an RFID reader 14 and a signing station 12 if the application permits. In this example the RFID tag 20 is a passive tag but it will be appreciated that the RFID tag 20 may instead be an active tag, e.g. if the cost can be justified for the particular application. The RFID reader 14 in this example also comprises a cryptographic processor 15 which has the capability of formatting a bit string and transmitting the bit string as a challenge 16 to the RFID tag 20. The cryptographic processor 15 in this example is also configured to perform ECC cryptographic operations that suit the particular application. The RFID tag 20 is capable of receiving the challenge 16, generating a bit string, and returning the bit string to the RFID reader 14 as a response 18. The RFID reader 14 may then use the cryptographic processor 15 to verify the response 18 for authenticating the RFID tag 20.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of components of the cryptographic processors 13, 15 or RFID tag 20, or accessible or connectable thereto. Any application or module herein described may be implemented using computer readable/executable instructions that may be stored or otherwise held by such computer readable media.

Figure 2:
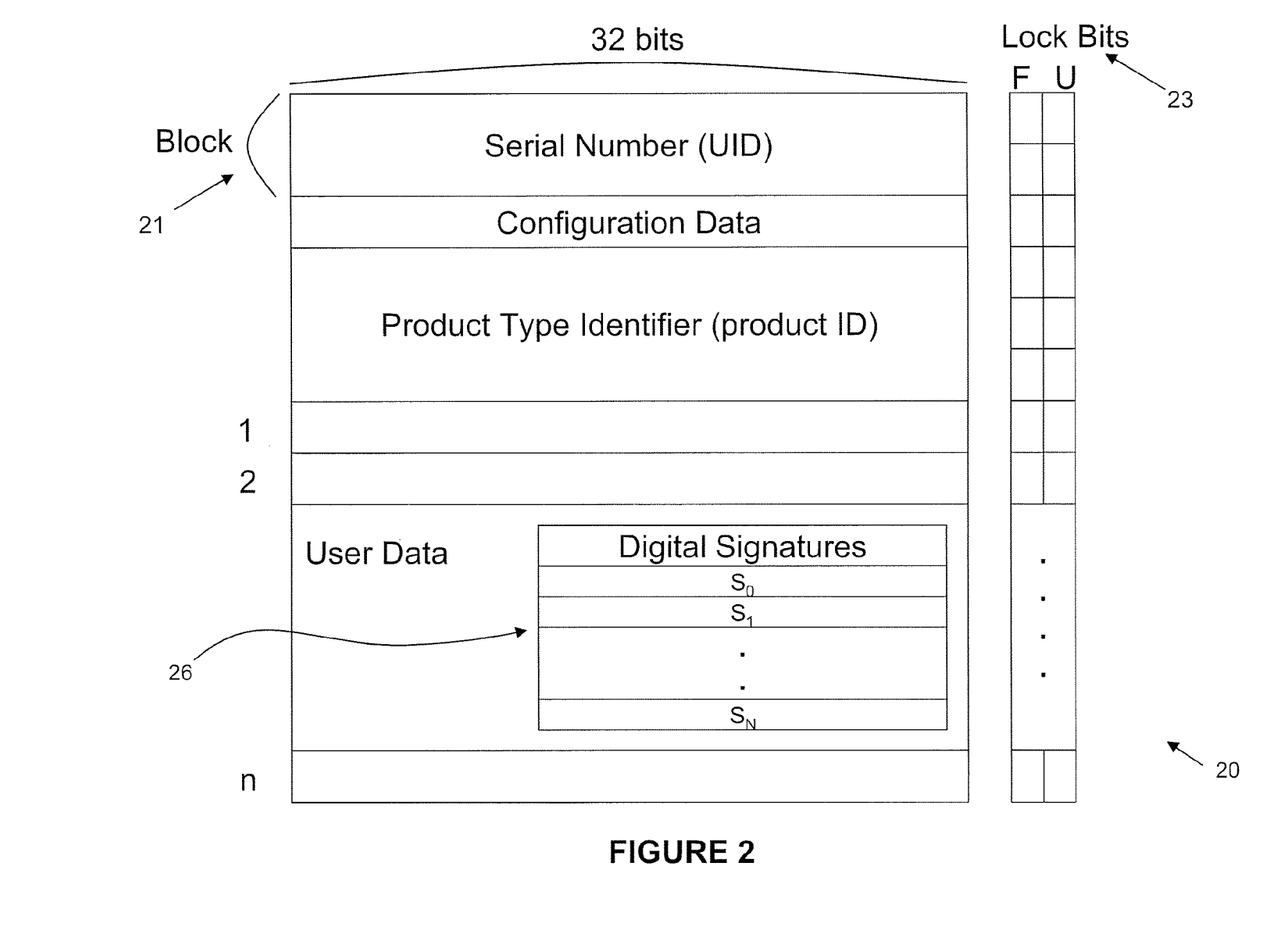
FIG. 2 is a schematic diagram of a generic RFID tag.

An example schematic structure for an RFID tag 20 is shown in FIG. 2. The RFID tag 20 in this example acts primarily as a data storage or memory component and the firmware for the RFID tag 20 is typically locked at the manufacturing stage. Such RFID tags 20 are typically configured therefore to respond to a fixed set of commands once they leave the manufacturing stage. The fixed set of commands are typically used for reading the data in memory, writing data to the memory, and locking data blocks. FIG. 2 illustrates a typical organization of memory blocks 21 for such an RFID tag 20.

In the example shown in FIG. 2, the RFID tag 20 is segmented into 32 bit blocks 21 with two lock bits 23 for each block 21, a factory lock bit (F) and a user lock bit (U). At the time of manufacturing the RFID tag 20, the RFID tag 20 is given a serial number, which is stored in the RFID tag's memory, in this example consuming two blocks 21 (therefore consuming a total of 64 bits). The serial numbers are typically burned into read only memory (ROM) by a trusted party to ensure that each RFID tag 20 is unique. The serial number in this example is shown and hereinafter referred to as a unique identifier (UID), which is programmed and locked at the manufacturing stage, and is unique to each RFID tag 20. At the time of manufacturing the RFID tag 20, configuration data can also be added to the RFID tag 20, and in this example such configuration data consumes all or a portion of one block 21 (e.g. up to 32 bits). For example, the configuration data may include the domain parameters of an elliptic curve cryptographic system, and may store the public key Q of the signing station 12.

Also shown in FIG. 2 is a product type identifier (shown and hereinafter referred to as a "product ID"), may also be added to the RFID tag 20. The use of a product ID is particularly advantageous in applications that have various product types, e.g. pharmaceutical products. The product ID in this example consumes an additional three blocks 21 or 96 bits. The remaining memory blocks 21 available on the RFID tag 20 are dedicated to user data. In this example, the user data is used to store a plurality of digital signatures 26, each digital signature 26 being represented by a bit string stored in the user data. The number of digital signatures 26 capable of being stored, e.g. N in this example, will vary based on the size of the individual digital signature 26 and the available memory on the RFID tag 20.

It can be appreciated that the smaller the signature size, the greater the number of digital signatures 26 that can be stored when provided with a fixed amount of memory on the RFID tag 20. It has therefore been recognized that a signature scheme based on ECC is particularly advantageous for use in the system 10, since ECC can provide a smaller signature size for a particular cryptographic strength. For example, a 168 bit ECC signature has been found to provide similar security strength as a typical 1024 bit RSA signature. Consequently, by using ECC in the system 10, multiple signatures can be more readily stored on a single RFID tag 20 enabling the operations discussed below to be implemented.

As is known in the art, ECC is implemented in an algebraic system defined on a group of points of an elliptic curve over a finite field, and encryption schemes using ECC are based on the intractability of the discrete log problem in finite groups.

In one example, the domain parameters of such an ECC cryptosystem are: an elliptic curve having the form $y^2=x^3+dx+c$, a finite field F, an elliptic curve group E (comprising a set of points that are defined by elements of the underlying field and satisfy the elliptic curve equation together with the point at infinity), and a seed point G that can be used to generate each element of the elliptic curve group E. Each point on the elliptic curve is defined by a pair of elements of the underlying finite field that satisfy the equation of the curve. One correspondent in the cryptosystem has a private key a, $0<a<n$ where n is the order of the point G and a corresponding public key $Q_A=aG$. The public key may be certified by a certifying authority (CA) who signs the public key of a correspondent and, thereafter, the signature added by the CA on the public key, may be verified by another correspondent who trusts the CA, in order to authenticate the public key $Q_A$.

To achieve the same security level as a 1024 bit RSA signature, an elliptic curve key size of 160 bits or higher should be used. One of the examples described herein uses the Elliptic Curve Pintsov-Vanstone signature (ECPVS) scheme, and another of the examples uses the Elliptic Curve Digital Signature Algorithm (ECDSA) scheme for implementing the challenge-response authentication process executed by the system 10. It can be appreciated that other ECC schemes can also be used according to the principles discussed herein. It can also be appreciated that the principles discussed herein may also be applied to other cryptographic schemes, whether known or yet to be discovered, that make it possible to include multiple digital signatures on the same RFID tag 20.

The ECPVS scheme is a digital signature scheme that enables message recovery, which suggests that part of the message being signed is hidden in the signature and can be recovered during the signature verification process. The ECPVS scheme is specified in IEEE 1363a-2004, ISO/IEEE 9796-3, and as a draft ANSI standard. In the ECPVS scheme, a message M that is to be signed is at least conceptually divided into two separate and distinct portions or sets of data H and V (e.g. M=H||V). The value H is a portion of the message or a set of data that is to be hidden in the signature and recovered during the verification process. The value V is another portion of the message or another set of data, which is also signed but can be sent "in the clear" as plaintext or is otherwise readily or publicly available, and used in the verification process. The portion H can only be recovered by those entities that possess a particular verification key and the portion V can be read by any entity, e.g. any RFID reader 14, without verifying the signature. It can be appreciated that this enables sensitive data to be hidden in the signature only to be read by a device having the public key of the signing station 12, while other data can be left in the clear for other uses such as basic identification of the product 22 or RFID tag 20 itself.

The ECPVS signature generation algorithm typically begins by specifying a particular characteristic for the portion H that can be examined when verifying the signature. For example, one can examine the portion H once recovered to determine if the recovered portion H has a particular amount of redundancy (e.g. redundancy that is above a predetermined limit deemed sufficient to prevent an existential forgery attack). In an another example, a data string or set of data that is capable of being compared to a known and expected value may be used as a characteristic to verify the signature. The following summarizes ECPVS signature generation operations that may be performed by a signer (e.g. the signing station 12), wherein the signer has a long term private key w and a corresponding public key W.

First, an ephemeral key pair (k, Q) is generated, wherein Q=kG and is a point on the elliptic curve, k is a random integer $1 \leq k < n$, and n is the order of the group generated by the elliptic curve base point G. Next, a key $k_1$=KDF(Q) is constructed, wherein KDF is a key derivation function. In general, a KDF is used to derive a secret key from a secret value and/or other known information. In the ECPVS scheme, the KDF uses, as an input, the point Q and possibly other information, and generates an encryption key $k_1$. The signer then computes a first signature component c as c=$ENC_{k_1}$(H), i.e. an encrypted value encrypting the portion H using a key $k_1$, wherein ENC is a suitable encryption scheme that takes as an input plaintext (e.g. H) and encrypts it with a key $k_1$ to produce ciphertext c.

Figure 3:
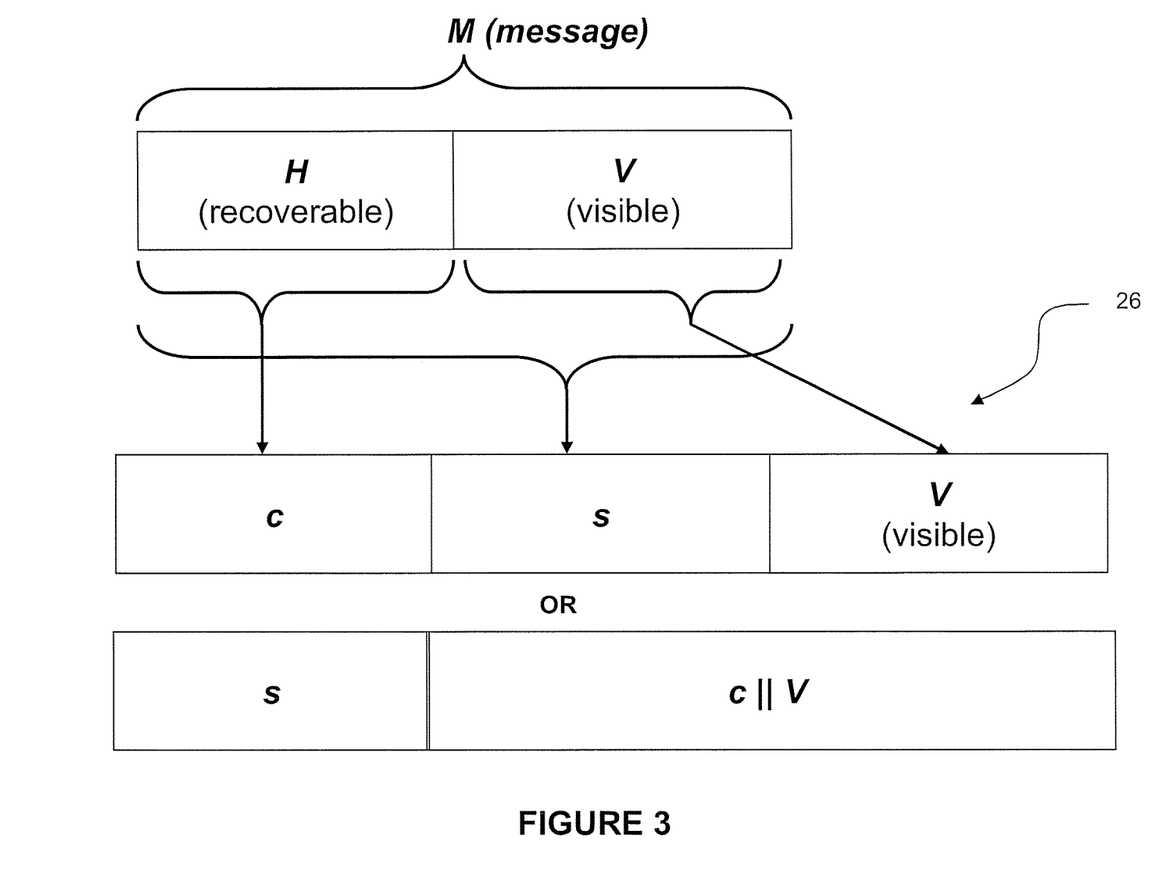
FIG. 3 is a schematic representation of an ECPV signature.

Next, an intermediate component h is computed as h=Hash (c||V), where Hash is a suitable hash function, e.g. SHA1. If preferred, additional information that may be available or become available to parties verifying the signature (in other words information that the verifier needs 'on the side' for verification), e.g. a certificate or identifying information of the signer, may be incorporated into h. The intermediate component h is then converted to an integer e. A second signature component s is then calculated using a suitable signing equation, such as the Schnorr algorithm, wherein: s=e·w+k mod n, w being a long term private key of the signer (e.g. the signing station 12 in the examples discussed herein). The resultant signature 26 comprises the components c, s, and V, wherein the components may be communicated as a set of three components (c, s, V) or as a set of two components (s, c||V) as illustrated schematically in FIG. 3.

The following steps may be performed in order to verify an ECPVS signature having the form: (s, c||V), when the verifier is provided with or otherwise has access to the signer's genuine public key W.

First, the intermediate component h is computed using the component c||V, the same hash function used in generating the signature, and any additional information (such as data identifying the signer), such that, in this example: h=Hash(c||V). Next, h is converted to an integer e. A representation Q' of the ephemeral public key Q is then computed using the integer e, the public key W of the signer, the base point G, and the signature component s, e.g. such that, in this example: Q'=sG−eW. Next, a decryption key $k_1'$ is computed using the same KDF used by the signer when generating the signature, also using the same additional information (if any), such that, in this example: $k_1'$=KDF(Q'). A representation H' of the hidden portion H is then recovered by decrypting the component c using the decryption key $k_1'$ derived per the above, and a complementary decryption function DEC, such that, in this example: H'=$DEC_{k_1'}$(c). The verifier may then recover the specified characteristic, such as a particular format, e.g., the expected value or redundancy contained in H'. If H' contains the necessary characteristic, then H' is a valid portion of the message M and the signature is verified. Otherwise, a null and invalid signature is returned.

Since the message M has been subdivided, it is only necessary for one portion, e.g. H, to contain the requisite characteristic and to be hidden. The other portion V is plaintext that has the same structure as in the original message M and thus can improve bandwidth efficiency. As such, when the ECPVS scheme is used in authenticating an RFID tag 20, the visible portion V may include any portion of data that is not required to be confidential but needs to be available to the RFID readers 14. The portion H hidden in c can, on the other hand, contain confidential information which is only available to those individuals who have the public key W of the signer. It can then be appreciated that the data contained in V is 'visible' and thus available to any device or entity that is capable of reading the RFID tag 20.

Figure 4:
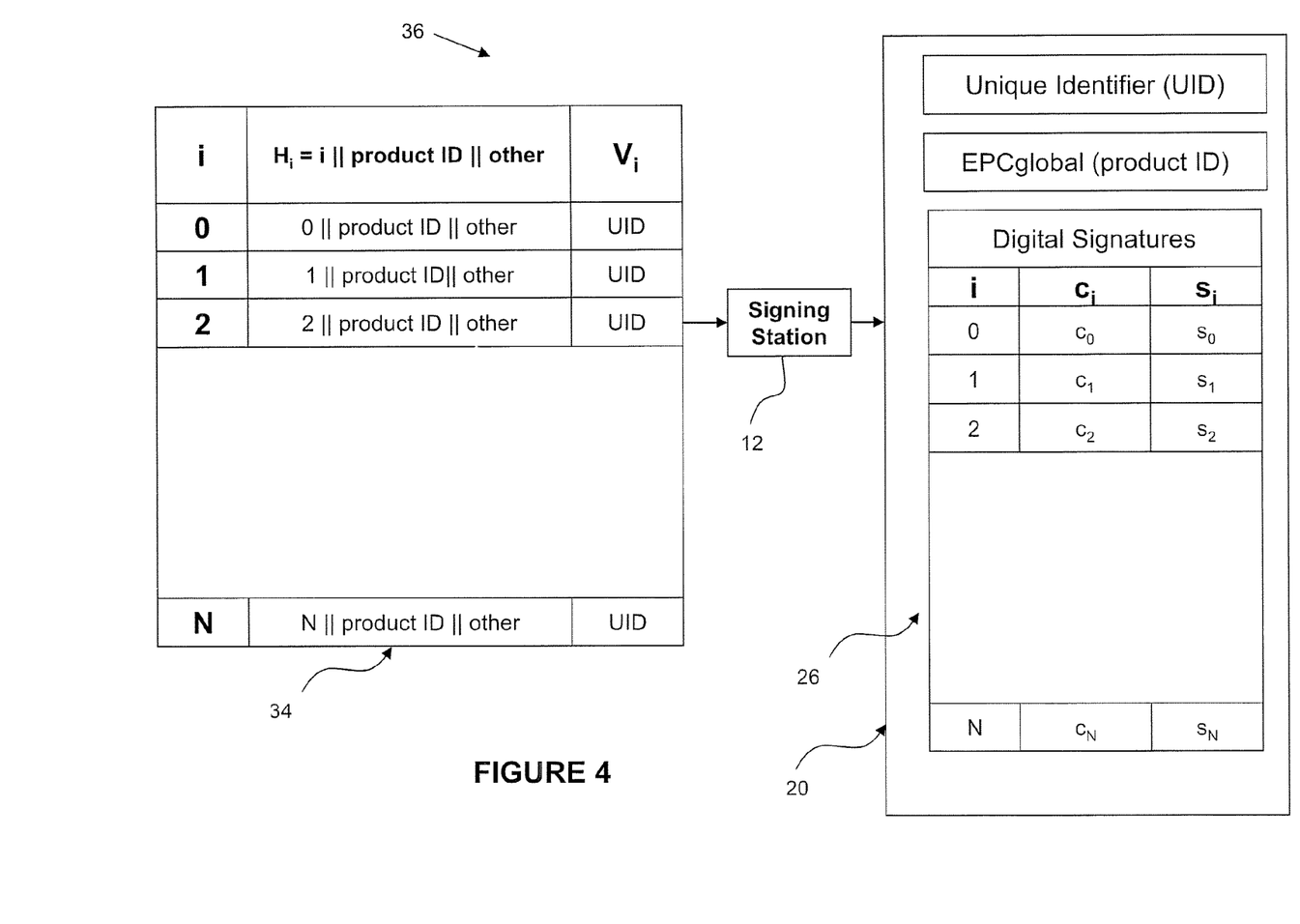
FIG. 4 is a schematic block diagram showing the generation of plurality of ECPV signatures for an RFID tag.

Referring now to FIG. 4, a signing stage 36 is shown for generating a plurality of ECPVS scheme signatures 26, and storing those signatures 26 on an RFID tag 20. In the example shown, the signing station 12 obtains an input data set 34 used to generate the plurality of ECPVS scheme signatures 26. The input data set 34 provides a table or other mapping for a set of index values i, a hidden message portion $H_i$ for a respective index value, and a visible message portion $V_i$. In this example, the visible message portion $V_i$ is reused for each table entry (row). However, it can be appreciated that in other applications, the visible message portion $V_i$ can be unique to each table entry. In this example, the UID is reused for each table entry. The hidden message portion $H_i$ in this example is generated by combining, e.g. through concatenation as shown, the respective index value i, a product ID associated with the product 22 to which the RFID tag 20 is to be attached, and other data such as an amount of redundancy (e.g. a particular number of zeros or other padding). It can be appreciated that the hidden portion $H_i$ may be used to hide sensitive data, such as a product type identifier (product ID) in a pharmaceutical supply chain.

The signing station 12 generates a portion of the input set 34, such as the index value i, while the remaining portion(s), e.g. the UID and product ID may be obtained by reading the RFID tag 20 or through user or other input. Referring back to FIG. 3, and the above-described steps for generating an ECPVS signature, the hidden portion, $H_i$ including the index value i can be used by the cryptographic processor 13 to generate a corresponding first signature component, $c_i$. A corresponding second signature component $s_i$ may then be calculated using $H_i$ and $V_i$. The resultant signature is then be provided in the form: ($c_i$, $s_i$, $V_i$); to enable the signing station 12 to write or otherwise store that signature 26 on the RFID tag 20. This can be repeated for each index value i so that a plurality of unique signature component pairs ($c_i$, $s_i$) are generated by varying the index value i in the recoverable portion, $H_i$. As can be seen in FIG. 4, the set of signatures 26 is then stored on the RFID tag 20. In addition, the visible portion $V_i$, which is the UID in this example, is already pre-stored in the RFID tag 20, does not need to be duplicated for each signature 26, and thus the memory requirements of the RFID tag 20 are reduced.

Figure 5:
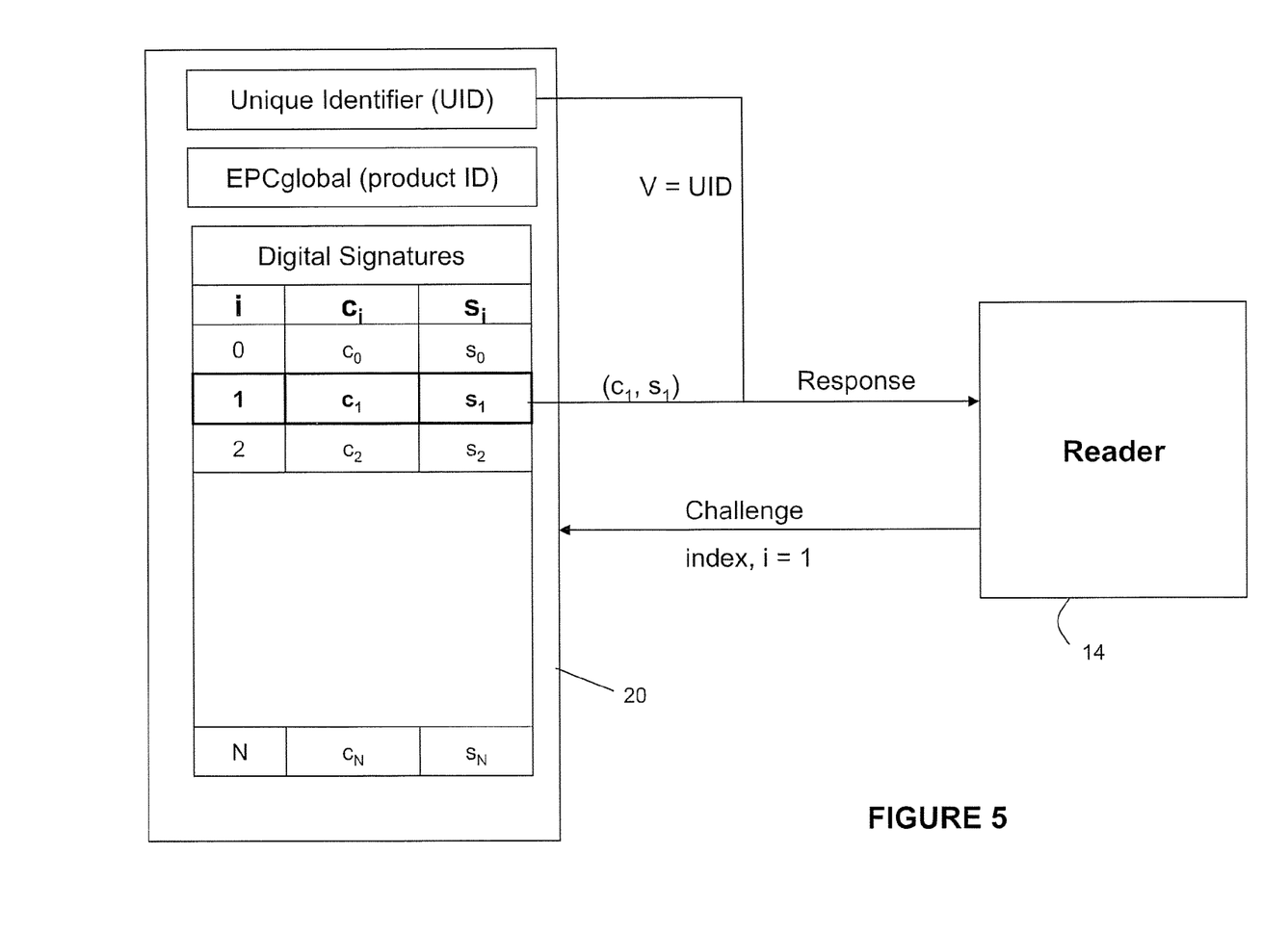
FIG. 5 is a schematic block diagram illustrating a challenge-response system using the ECPV signature scheme.

An embodiment illustrating a challenge-response scheme using the system 10 is shown by way of example in FIG. 5. In the example shown, it is assumed that the RFID reader 14 and the RFID tag 20 are within a communicative range. The RFID reader 14 sends a challenge 16 comprising an index value i to the RFID tag 20. The index value i may be a randomly generated integer which is in the range of an upper value and a lower value determined according to the number of signatures 26 that can be stored on the RFID tag 20 in the particular application. The lower value can typically be assumed to be equal to zero, while the upper value, N, can be any suitable value that, for example, is fixed at the manufacturing stage, or is otherwise known to the RFID reader 14 or communicated by the RFID tag 20 to the RFID reader 14, prior to the RFID reader 14 sending the challenge 16 (index value i). The RFID reader 14 may include instructions for checking that N is above a minimum value to prevent an interloper indicating that only a single signature 26 is being used.

In the example shown in FIG. 5, an index value, i=1, is used as the challenge 16. The response 18 to the challenge 16 used by the RFID tag 20 is the corresponding $i^{th}$ pair signature components, $c_i$, $s_i$. The visible portion $V_i$ is then transmitted from the RFID tag 20 to the RFID reader 14, or the RFID reader 14 may utilize other mechanisms to determine the remainder of the message M. The RFID reader 14 then verifies the signature using the public key W of the signing station 12 following the steps for ECPVS signature verification as described above. The public key W may be recovered from the RFID tag 20 or, where there is a signing station 12, the RFID reader 14 may obtain or be given access to the public key W. A representation $H_i'$ of the hidden portion $H_i$ can be recovered by decrypting the component $c_i$. The RFID reader 14 then checks for a particular characteristic in $H_i''$ to authenticate the RFID tag 20 as discussed above. In one embodiment, the index value i may be recovered from $H_i'$ and compared to the challenge index value i sent to the RFID tag 20 in the challenge 16. In an another embodiment, the RFID reader 14 may check that the required amount of redundancy is present in the representation of the non-recoverable portion $H_i'$. If the signature 26 is verified, then the RFID tag 20 is deemed to be genuine. If the signature 26 is not verified, then it is rejected.

By storing a relatively large number of signatures 26 (e.g. compared to other schemes such as RSA), each being available to be chosen randomly via the challenge 16 sent by the RFID reader 14, an eavesdropper cannot gain any advantage by monitoring the individual signature 26 being transmitted. Subsequent interrogation of the RFID tag 20 by an RFID reader 14 should, in all probability, generate a different index value i and, thus require a different signature 26. In this way, skimming of the RFID tag 20 becomes more time consuming, ultimately more difficult, and thus should be prohibitive to the interloper. The RFID reader 14 can choose the index values i in any manner it desires, but should be non-repeating as shown in this example.

Figure 6:
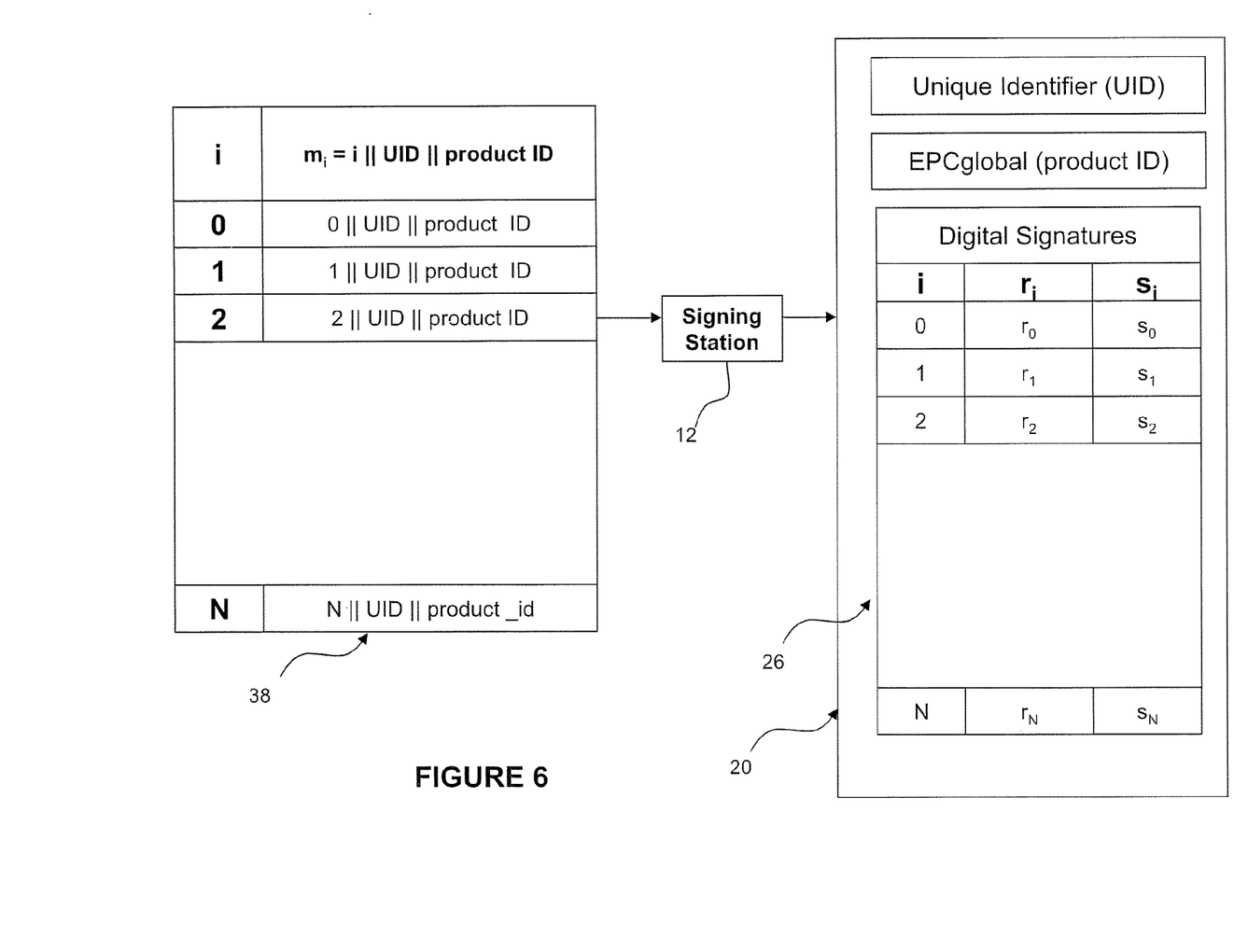
FIG. 6 is schematic block diagram showing the generation of a plurality of ECDSA signatures for an RFID tag.
Figure 7:
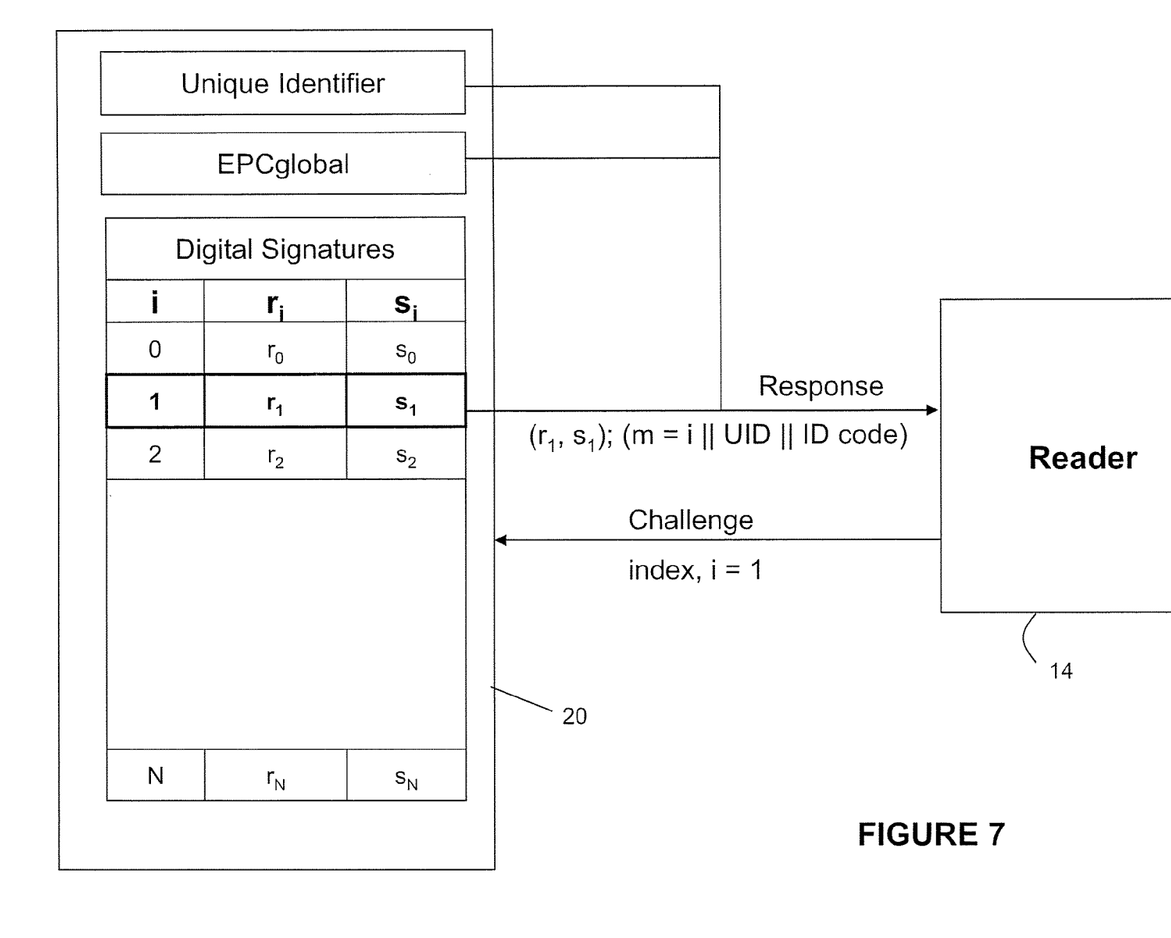
FIG. 7 is a schematic block diagram illustrating a challenge-response system using the ECDSA signature scheme.

In another embodiment, shown in FIGS. 6 and 7, the challenge-response principles described above may also be implemented using an ECDSA signature rather than an ECPVS signature, in particular for applications wherein message recovery is not required.

The ECDSA is a widely standardized elliptical curve-based signature scheme, appearing in the ANSI X9.62, FIPS 186-2, IEEE 1363-2000 and ISO/IEC 15946-2 standards as well as several draft standards.

The ECDSA signature generation scheme operates on several domain parameters, namely: a long term private key d, a point P, and a message m. The signature generation scheme outputs a pair of signature components (r, s), wherein r and s are integers. An overview of the ECDSA operations is as follows:

1. Select an ephemeral private key k, where $k \in_R [1, n-1]$, and n is the order of the group generated by the elliptic curve base point, the base point also being one of the domain parameters.

2. Compute an ephemeral public key $kP=(x_1,y_1)$ and convert $x_1$ to an integer $\bar{x}_1$, where P is a point on an elliptic curve E and is one of the domain parameters.

3. Compute $r=\bar{x}_1 \bmod n$, wherein if r=0, then a different ephemeral private key k is selected (i.e. go back to step 1).

4. Compute e=H(m), where H denotes a cryptographic hash function whose output has a bit-length that is no more than the bit-length of n (if this condition is not satisfied, then the output of H can be truncated).

5. Compute $s=k^{-1}(e+dr) \bmod n$, where d is the long term private key of the signer, and wherein if s=0, then go back to step 1.

6. Output the pair of signature components (r, s) as the ECDSA signature.

The ECDSA signature verification process operates on several domain parameters, namely: the long term a public key Q corresponding to private key d, i.e. Q=dP; the message m, and the signature (r, s) derived above. The ECDSA signature verification process outputs a rejection or acceptance of the signature, and proceeds as follows:

1. Verify that r and s are integers in the interval [1,n−1]. If any verification fails then a rejection is returned.

2. Compute e=H(m).

3. Compute $w=s^{-1} \bmod n$.

4. Compute $u_1=ew \bmod n$ and $u_2=rw \bmod n$.

5. Compute $R=u_1P+u_2Q$

6. If R=∞ then the signature is rejected.

7. Convert the x-coordinate $x_1$ of R to an integer $\bar{x}_1$; compute $v=\bar{x}_1 \bmod n$.

8. Compute $V=\bar{x}, \bmod n$.

9. If v=r then the signature is accepted, if not then the signature is rejected.

As discussed above, an ECDSA signature is made up of two integers, namely r and s, both of which are bit strings of the same size as the order of the curve. For example, with a curve of order 160, the signature size is 160×2=320 bits or 40 bytes.

Referring now to FIG. 6, a signing stage 37 for generating a plurality of ECDSA signatures 26 is shown. In FIG. 6, it can be seen that an input data set 38 for this embodiment maps the index values i to corresponding messages $m_i$, that are then signed using the ECDSA signature generation scheme. In this example, the message $m_i$ is a combination (e.g. concatenation) of the index value i, the UID of the RFID tag 20, and the product ID. The signing station 12 will then generate a plurality of digital signatures $(r_i, s_i)$ from the input set 38, that being will generate a digital signature 26 for each index i and write or store these digital signatures 26 on RFID tag 20. In order to utilize the ECDSA signature generation scheme, the signing station 12 is configured for generating and using an ephemeral private key k. It can be appreciated that unique signature components $(r_i, s_i)$ are generated by varying the index value i in the message $m_i$ that is signed.

An embodiment illustrating a challenge-response scheme using the system 10 configured for implementing the ECDSA, is shown by way of example in FIG. 7. In the example shown, it is assumed that the RFID reader 14 and the RFID tag 20 are within a communicative range. In this example, the challenge 16 provided comprises an index value i in a manner similar to that shown in FIG. 5. The response 18 to the challenge 16 generated by the RFID tag 20 is the corresponding $i^{th}$ pair of signature components $(r_i, s_i)$ and the message $m_i$ as seen in FIG. 7. The reader 14 then verifies the signature using the message $m_i$, the pair of signature components $(r_i, s_i)$, and the public key Q of the signing station 12, which is either read from the RFID tag 20 or assumed (or otherwise obtained) if the RFID tag 20 is used within a defined security zone. The digital signature may be verified according to the steps for ECDSA signature verification described above. If the correct index value i is not present, the signature will not be verified and the RFID tag 20 would be rejected.

Accordingly, it can be seen that the principles for incorporating a plurality of digital signatures on an RFID tag 20, to enable different signatures to be used to verify the RFID tag 20 at different times, to avoid skimming, can be applied to both signature schemes providing message recovery and those that do not.

Figure 8:
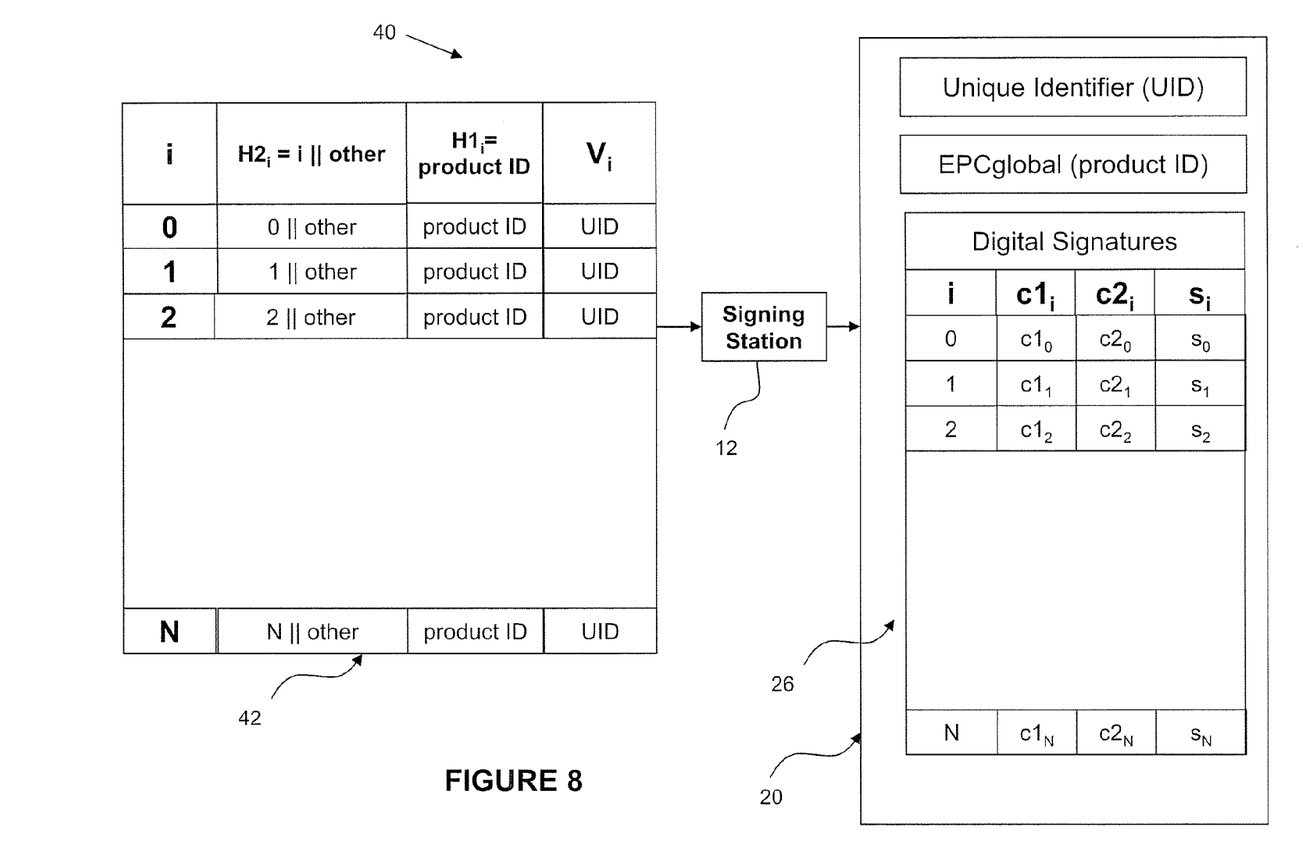
FIG. 8 is a schematic block diagram showing the generation of a plurality of ECDSR signatures for an RFID tag.
Figure 9:
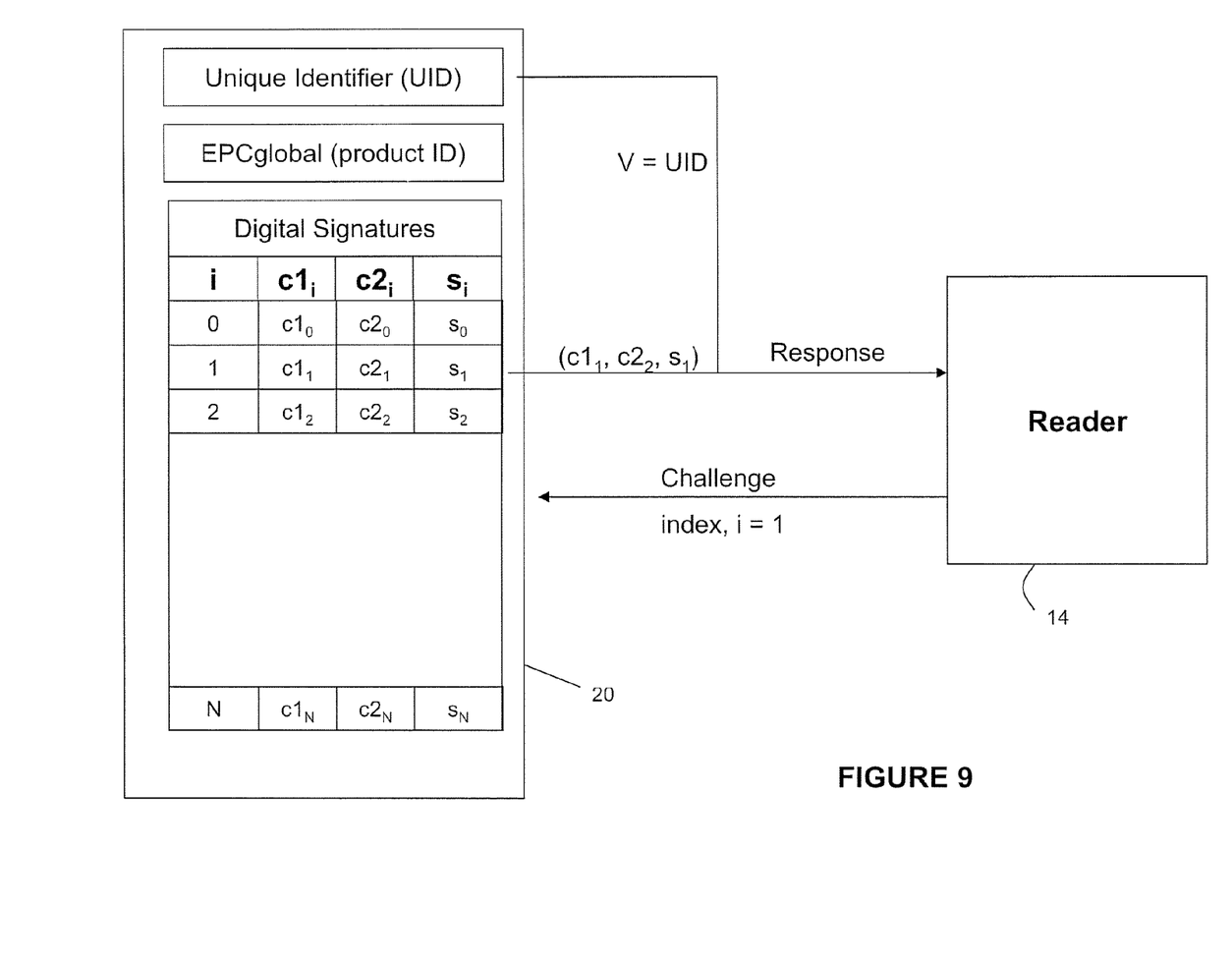
FIG. 9 is a schematic block diagram illustrating a challenge-response system using an embodiment of the ECDSR signature scheme.

Another example utilizing a signature scheme providing message recovery is shown in FIGS. 8 and 9. In this example, the principles described herein are applied to another signature scheme with message recovery, namely an Elliptic Curve Digital Signature with Recovery (ECDSR) scheme, embodiments of which are described in U.S. patent application Ser. No. 12/230,799 (the '799 application), entitled "Signatures with Confidential Message Recovery"; the '799 application having been filed on Sep. 4, 2007, and the contents of which are incorporated herein by reference. It can be appreciated that when using the ECDSR, the same considerations regarding security and RFID tag size apply as discussed above. A brief summary of one of the ECPV-based ECDSR embodiments described in the '799 application is as follows.

For signature generation, an entity A (e.g. the signing station 12) uses its private key $d_A$, an entity B's public key $G_B$ (e.g. the RFID reader 14), and signs the message M, having plaintext V and hidden portions $H_1$ and $H_2$, which will be encrypted. Entity A generates an ephemeral key pair (k, Q) and then using k and the public key $G_B$, constructs a value $Q_B=kG_B$. The value $Q_B$ is used to create an encryption key for encrypting the portion $H_1$ so that only entity B (or an entity having access to B's private key if applicable) can recover or unlock the confidential information contained in the portion $H_1$.

Two encryption keys are computed using a key derivation function: $k_1=KDF(Q_B)$ and $k_2=KDF(Q)$. Using the two encryption keys, the recoverable and confidential portions are then encrypted, using a suitable encryption scheme, to generate a pair of corresponding signature components: $c_1=ENC_{k_1}(H_1)$ and $c_2=ENC_{k_2}(H_2)$. The encryption scheme ENC takes as input plaintext $(H_1, H_2)$ and encrypts the plaintext using secret keys $(k_1, k_2)$ and produces a pair of ciphertext components $(c_1, c_2)$, which are used as signature components.

An intermediate value h is then computed by hashing a combination (e.g. concatenation) of the pair of signature components $c_1$ and $c_2$ and the visible portion V: h=Hash $(c_1\|c_2\|V)$. Hash is a suitable hash function, e.g. SHA1, that may also incorporate additional information such as identity information of entity A into h. The value h is then converted into an integer e to be used in computing another signature component s.

The signature component s, as is done in ECPVS, can be computed using a suitable signing equation such as the Schnorr equation: $s = e \cdot d_A + k \mod n$. The resultant signature having the set of components $(s, c_1\|c_2\|V)$ may then be provided as an output.

In this way, the portion $H_2$ can be recovered by entity B or any other entity Z using the public key of the signer A. A process of partial message recovery is thus possible, which involves obtaining a representation $H_2'$ of the portion of the message $H_2$ having a particular amount of redundancy so that the redundancy can be checked to verify the signature. For the purpose of this illustration, it will be assumed that the verifying entity is an RFID reader 14 that cannot recover $H_1$ because it does not possess the secret key $d_B$, and thus $H_1$ remains confidential with respect to that RFID reader 14.

The RFID reader 14 obtains the signature having components $(s, c_1\|c_2\|V)$ and uses the public key $G_A$ of the signing entity, in this example, the signing station 12, to verify the signature. The intermediate value h is first computed using the same hash function, Hash, and the combination $c_1\|c_2\|V$, and any additional information that is to be used in creating h. The value h is then converted into an integer e and a representation Q' of the ephemeral key Q is then computed using the signature component s, the public key $G_A$, and the point G as: $Q' = sG - eG_A$. Having computed Q', the RFID reader 14 then uses the same key derivation function KDF to obtain a decryption key $k_2' = KDF(Q')$. The decryption key $k_2'$ and the signature component $c_2$ are then used, with the complementary decryption function DEC, to recover $H_2'$ from $c_2$. Having recovered $H_2'$, the RFID reader 14 then checks for the characteristic, e.g. a certain amount of redundancy, and accepts or rejects the signature on this basis. As such, if the RFID reader 14 does not find the proper amount of redundancy, the signature is deemed to be invalid.

A process can also be used to both verify the signature and recover the confidential portion $H_1$, for example, if an RFID reader 14 is allowed to both verify the digital signatures 26 and recover the confidential data hidden in the digital signatures 26. In such a case, the RFID reader 14 obtains the digital signature 26 having components $(s, c_1\|c_2\|V)$ and uses the public key $G_A$ of the signing station 12 and its own private key $d_B$, to verify the signature. As above, the intermediate value h is first computed using the same hash function Hash and the combination $c_1\|c_2\|V$ and any additional information used when creating h. The value h is then converted into an integer e and a representation Q' of the ephemeral key Q is then computed using the signature component s and the public key $G_A$ as: $Q' = sG - eG_A$. As can be appreciated from above, the value $Q_B$ was computed using the public key of the RFID reader 14, that being $G_B$. As such, the RFID reader 14 can compute a representation $Q_B'$ of the value $Q_B$ using its private key $d_B$, the signature component s, the integer e, the public key $G_A$, and the point G as follows: $Q_B' = d_B \cdot sG - d_B \cdot eG_A$. Having computed Q' and $Q_B'$, the RFID reader 14 then uses the same key derivation function KDF to obtain decryption key $k_2' = KDF(Q')$ as above, and also to obtain decryption key $k_1' = KDF(Q_B')$. The decryption keys $k_1'$ and $k_2'$ and the signature components $c_1$ and $c_2$ are then used, with the complementary decryption function DEC, to recover $H_1'$ and $H_2'$ from $c_1$ and $c_2$ respectively. Having recovered $H_1'$ and $H_2'$, the RFID reader 14 then checks for the proper amount of redundancy in $H_2'$, and accepts or rejects both $H_1'$ and $H_2'$ on this basis since, if the redundancy in $H_2'$ is incorrect, the signature is invalid or has been compromised in some way.

By incorporating an ECDSR type signature scheme, it can therefore be seen that being able to specify a particular characteristic, which is then encrypted in the recoverable portion (e.g. $H_2$) in an ECPV signature, enables one to check a predictable, recoverable output for verifying the signature. Also, using the public key of the RFID reader 14 when encrypting the confidential portion, enables one to limit who/what can recover the confidential portion to one or more specific entities, in this example, a particular RFID reader 14. It can be appreciated that this example embodiment is for illustrative purposes only and that the principles described herein can also be implemented using a plurality of portions, e.g. H and V only, wherein the hidden portion H is computed as $H_1$ in the above and is also used to verify the signature. As such, in general, the message is divided into a plurality of portions.

Turning now to FIG. 8, a signing stage 40 for an embodiment utilizing ECDSR comprises an input data set 42 that separates the hidden portion $H_i$ for each index into two portions $H1_i$, and $H2_i$. The portion $H2_i$ in this example is a concatenation of the index and the other information such as redundancy and can be recovered by any reader having access to the signing station's public key. The portion $H1_i$ in this example contains the product ID which is hidden for a particular RFID reader 14, e.g. by using a corresponding public key for that particular RFID reader 14. Using the above-described ECDSR signature generation operations, a plurality of digital signatures 26 are generated and stored on the RFID tag 20. However, when compared to the embodiment shown in FIG. 4, it can be seen that each signature has three components in addition to the visible portion V, namely $(c1_i, c2_i, s_i)$. It may be noted that $c1_i$, when the same for each index, enables the RFID tag 20 to store only one c1 value and have the system 10 recognize that it is common to all signatures thus providing further savings in memory.

As can be seen in FIG. 9, the challenge-response scheme for the embodiments shown in FIG. 8 can proceed in a manner consistent with that shown in FIG. 4, however, it can be appreciated that unless the product ID has been hidden in $H1_i$ using the public key of the particular RFID reader 14 shown in FIG. 9, the RFID reader 14 will only be able to verify the signature associated with the challenge 16. If the RFID reader 14 corresponds to the public key used to hide the product ID, the RFID reader 14 would be able to recover the product ID from $H1_i$. It can be appreciated that the same principles can be applied to other signature schemes providing confidential message recovery, such as one utilizing the ECDSA as shown in the '799 application. Accordingly, the principles described herein can be applied to various ECC signature schemes where multiple signatures can be stored on the same RFID tag 20.

The ECC signature scheme that is chosen will typically depend on the amount of storage available on the RFID tag 20 and the type of application, e.g. based on the use of the ECPV or the ECDSR signature schemes, when privacy of data is important.

The challenge-response system described herein increases the difficulty of a skimming attack on an RFID tag 20, whereby an attacker reads and copies the digital signature 26. A skimmer may be able to skim signature $S_j$ from an RFID tag 20, but, when the attacker attempts to impersonate the RFID tag 20, the challenger (e.g. RFID reader 14) in all probability will ask for a different signature $S_i$ than the signature $S_j$ that the attacker skimmed.

Furthermore, the attacker will require more power and time to obtain a large set of stored signatures, and thus making it more difficult to clone the tag. An additional mechanism to limit the number of signatures requested may be further utilized to increase the difficulty of skimming phase.

In one embodiment, the RFID tag 20 can be designed to "sleep" for a period after transmitting a signature in response to a challenge 16. One approach would be to wait 1 second between the first and second response, two seconds between the second and third, then 4 seconds, then 8 seconds, and so on. Of course, the starting time can be shorter or longer, and the factor between successive wait times can be made larger or smaller than two. To avoid very long waits during normal use, the RFID tag 20 can be designed to always run the sleeping cycle after sending out a signature, and then if a further challenge 16 is not received during this period, it can reduce the next wait time back to normal, or at least to a lower value. More generally, the RFID tag 20 can be configured to ensure that multiple signatures 26 cannot be read out too fast, by imposing any reasonable restrictions.

In addition, the principles described herein can be supplemented with known cryptographic operations to further increase the security of the RFID tag 20 as will now be described. It should be noted that having a multiplicity of pre-stored signatures can be supplemented by a careful combination with a more conventional system such as the DST. That is, the RFID tag 20 can also compute a cryptographic operation to verify its identity, in addition to providing one of the stored signatures 26.

In symmetric key cryptosystems, where the RFID reader 14 and the RFID tag 20 have access to a shared secret, as in the DST system, the RFID reader 14 can apply a keyed cryptographic function, such as MAC, to a separate random challenge 16 provided from the RFID reader 20. To further reduce cost and processing power, however, some synergy and pre-stored signatures may be obtained. For example, the shared secret may be combined with the signature response $S_i$. If the signature scheme being used is the ECPVS scheme using a block cipher such as AES, then the RFID reader 14 can combine the signature 26 and the shared secret with an exclusive-or (XOR) operation, which is known to be particularly efficient. The RFID reader 14, who also possess the shared secret, can undo the XOR operation to recover the signature. An unauthorized skimmer however, would effectively have the signature covered by a one-time pad. Even if the skimmer obtains two protected signatures, because the padding is done to effectively random ciphertext, it would be difficult for the skimmer to recover the signature, other than by using an exhaustive search over all values of the shared secret.

Although the above principles have been described making reference to certain specific embodiments, it will be appreciated that various modifications thereof are applicable within the scope of the claims appended hereto.

The invention claimed is:

1. A method of enabling a radio frequency identification (RFID) tag to be authenticated, the method comprising:
   generating a plurality i of digital signatures using a digital signature scheme providing message recovery,
   wherein each digital signature comprises a recoverable first signature component generated from a hidden message portion $H_i$ comprising a concatenation of respective index value i unique to that digital signature and a hidden message portion value H, and a second signature component generated from the hidden message portion $H_i$ and a visible message portion $V_i$; and,
   storing the plurality of digital signatures with the corresponding visible message portions $V_i$ on the RFID tag in association with the respective index values i to enable a desired digital signature and visible message portion $V_i$ to be selected according to a provided index value;
   wherein the hidden message portion $H_i$ of the selected digital signature is recoverable from the first signature component.

2. The method according to claim 1, wherein the hidden message portion value H comprises a product identifier (ID), the product ID being associated with a product with which the RFID tag is to be used.

3. The method according to claim 1, wherein the digital signature scheme providing message recovery is the Elliptic Curve Pintsov-Vanstone Signature (EPVS) scheme, wherein the ECPVS scheme encrypts the respective hidden message portion $H_i$ in generating the recoverable first signature component.

4. The method according to claim 1, wherein the respective visible message portions $V_i$ comprise a single common visible message portion V for all of the plurality of digital signatures and corresponding to a single UID for that RFID tag.

5. The method according to claim 1, wherein the digital signature scheme providing message recovery is the Elliptic Curve Digital Signature with Recovery (ECDSR) scheme,
   wherein each digital signature further comprises a recoverable third signature component generated from a second hidden message portion $H_{2i}$,
   wherein the ECDSR scheme encrypts the respective index value i unique to that digital signature and the hidden message portion $H_i$ using a public key of a particular RFID reader to generate the first recoverable signature component, such that only that RFID reader can recover the hidden message portion $H_i$ from the recoverable first signature component, and the ECDSR scheme encrypts the second hidden message portion $H_{2i}$ using a public key available to all RFID readers to generate the recoverable third signature component, such that all RFID readers can recover the second hidden message portion $H_{2i}$.

6. The method according to claim 5, wherein the hidden message portion value H comprises a product ID, the product ID being associated with a product with which the RFID tag is to be used.

7. A non-transitory computer readable storage medium comprising computer executable instructions for enabling an RFID tag to be authenticated, the non-transitory computer readable storage medium comprising instructions for performing the method according to claim 1.

8. A system for enabling an RFID tag to be authenticated, the system comprising a cryptographic processor, a memory, and an interface for establishing a communicable connection to the RFID tag, the memory comprising computer executable instructions for causing the processor to perform the method according to claim 1.

9. A method of authenticating an RFID tag, the method comprising:
   randomly selecting an index value from a predefined range of index values;
   generating a challenge comprising the selected index value;
   providing the challenge to the RFID tag to enable the RFID tag to determine a corresponding digital signature stored thereon in association with the selected index value, wherein each digital signature comprises a recoverable first signature component generated from the hidden message portion $H_i$ comprising a concatenation of a respective index value i unique to that digital signature and a hidden message portion value H, and a second signature component generated from the hidden message portion $H_i$ and a visible message portion $V_i$;

obtaining a response from the RFID tag, the response comprising the corresponding digital signature; and authenticating the RFID tag using the corresponding digital signature by verifying the second signature component, and recovering the hidden message portion $H_i$ from the recoverable first signature component and verifying that the hidden message portion $H_i$ has a pre-determined amount of redundancy.

10. A non-transitory computer readable storage medium comprising computer executable instructions for authenticating an RFID tag, the non-transitory computer readable storage medium comprising instructions for performing the method according to claim 9.

11. An RFID reader configured for authenticating a RFID tag, the RFID reader comprising a cryptographic processor, a memory, and an interface for establishing a communicable connection to the RFID tag, the memory comprising computer executable instructions for causing the processor to authenticate the RFID tag by:

randomly selecting an index value from a predefined range of index values;

generating a challenge comprising the selected index value;

providing the challenge to the RFID tag to enable the RFID tag to determine a corresponding digital signature stored thereon in association with the selected index value, wherein each digital signature comprises a recoverable first signature component generated from a hidden message portion $H_i$ comprising a concatenation of a respective index value i unique to that digital signature and a hidden message portion value H, and a second signature component generated from the hidden message portion $H_i$ and a visible message portion $V_i$;

obtaining a response from the RFID tag, the response comprising the corresponding digital signature; and authenticating the RFID tag using the corresponding digital signature by verifying the second signature component, and recovering the hidden message portion $H_i$ from the first signature component and verifying that the hidden message portion $H_i$ has a pre-determined amount of redundancy.

12. The RFID reader according to claim 11, wherein the cryptographic processor is configured for performing the Elliptic Curve Pintsov-Vanstone Signature (EPVS) scheme to recover the hidden message portion $H_i$.

13. The RFID reader according to claim 11, wherein the cryptographic processor is configured for performing the Elliptic Curve Digital Signature with Recovery (ECDSR) scheme to recover the hidden message portion $H_i$ using a public key of the RFID reader.

14. A method of enabling an RFID reader to authenticate an RFID tag, the method comprising:

receiving a challenge from the RFID reader, the challenge comprising challenge index value randomly selected by the RFID reader from a predefined range of index values;

obtaining a requested digital signature from a plurality of digital signatures each being stored on the RFID tag in association with a respective index value, the requested digital signature corresponding to the index value provided by the RFID reader, wherein each digital signature comprises a recoverable first signature component generated from a hidden message portion $H_i$ comprising a concatenation of a respective index value i unique to that digital signature and a hidden message portion value H, and a second signature component generated from the hidden message portion $H_i$ and a visible message portion $V_i$; and providing a response to the RFID reader comprising the digital signature corresponding to the received challenge index value to enable the RFID reader to authenticate the RFID tag signature by verifying the second signature component, and recovering the hidden message portion $H_i$ from the recoverable first signature component and verifying that the hidden message portion $H_i$ has a pre-determined amount of redundancy.

15. A non-transitory computer readable storage medium comprising computer executable instructions for enabling an RFID reader to authenticate an RFID tag, the non-transitory computer readable storage medium comprising instructions for performing the method according to claim 14.

16. An RFID tag configured to perform the method according to claim 14.

* * * * *